Stevens & Fay,
Curtain Fixture.

Nº 54,434. Patented May 1, 1866.

Witnesses
Geo. W. Ray
F. A. Curtis

Inventors
Joshua Stevens
Wm. B. Fay

UNITED STATES PATENT OFFICE.

J. STEVENS AND W. B. FAY, OF CHICOPEE FALLS, MASSACHUSETTS.

IMPROVED CURTAIN-FIXTURE.

Specification forming part of Letters Patent No. 54,434, dated May 1, 1866.

*To all whom it may concern:*

Be it known that we, JOSHUA STEVENS and WILLIAM B. FAY, of Chicopee Falls, in the county of Hampden and State of Massachusetts, have invented a new and useful Improvement in Curtain-Fixtures; and we do declare the following to be a clear, full, and exact description of the same, reference being had to the accompanying drawings, making a part of this specification, in which—

Figure 1:
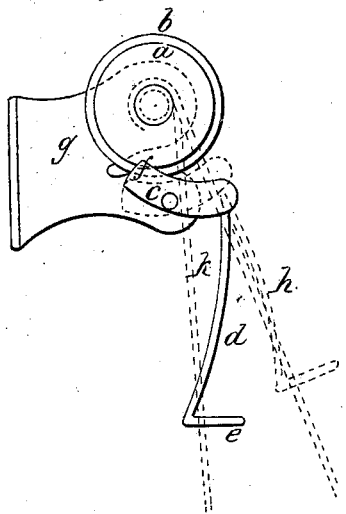
Figure 2:
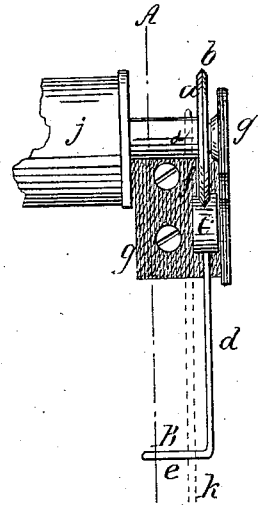
Figure 3:
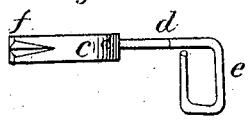

Figure 1 is a sectional view of the fixture through line A B of Fig. 2. Fig. 2 is a front view. Fig. 3 is a plan view of the lever-pawl.

The nature of our invention consists in making one rim of the spool of the curtain-roller V-shaped and one end of the lever-pawl made with a groove or notch to fit the V-shaped rim, and so adjusted that when the lever-pawl strikes the spool the pressure caused by the weight of the curtain on the roller shall cause it to bind or pinch, thereby holding the spool at whatever point it shall strike it.

To enable others skilled in the art to make and use our invention, we will proceed to describe its construction and operation.

In the drawings, *j* represents one end of the curtain-roller, upon which is fastened the spool *a*, upon which the cord *k* is wound and unwound in raising and lowering the curtain. *g* is its socket and support, which is screwed or fastened to the window frame or casing. The outer rim of the spool *a* is made V-shaped, as shown at *b*, and the end of the lever-pawl *c* is made with a groove or is V-shaped, as shown at *f*, to fit the V-shaped rim of the spool *a*.

*d* is a piece of wire fastened to the long end of the lever-pawl *c*, and is bent into an eye, as shown at *e*, through which the cord *k* passes, which operates the lever-pawl *c*. When the curtain is to be lowered the cord *k* is pulled outward, which places the lever-pawl *c* in the position *h*, as shown in red lines in Fig. 1. When the cord *k* hangs in a perpendicular position the weight of the long end of the lever-pawl *c* keeps the short end (which is made V-shaped) in contact with the V-shaped rim of the spool *a*, and the weight of the curtain tending to revolve the spool from the short toward the long end of the lever-pawl *c*, the V-shaped rim of the spool *a* is caught or pinched by the grooved end of the lever-pawl *c*, and the curtain is thus held firmly at any desired elevation.

We are aware that curtain rollers have been made to operate by a lever, ratchet, and catch; but these are very noisy in their operation, and especially annoying in a sick-chamber, particularly if they are somewhat worn and the ratchet does not readily catch. Our invention has advantages over others in this, that it is perfectly noiseless in its operation and can be used in a sick-chamber without any annoyance whatever. It is not so liable to wear out and so be rendered unfit for use, as the longer it wears the more perfectly does the lever-pawl catch and hold the spool and will last longer than those now made and in commerce.

Having thus described our invention, what we claim as new, and desire to secure by Letters Patent, is—

As a new manufacture, the spool *a*, having a beveled periphery, *b*, in combination with the grooved lever-pawl *c*, substantially as herein described and set forth.

JOSHUA STEVENS.
WM. B. FAY.

Witnesses:
T. ALDEN CURTIS,
GEO. W. RAY.